Aug. 22, 1967     I. M. MATAY     3,337,797
METHOD FOR DETERMIMING THE FACTOR OF ANISOTROPY
OF RESISTIVITY OF A GRAPHITE BODY
Filed Feb. 19, 1963
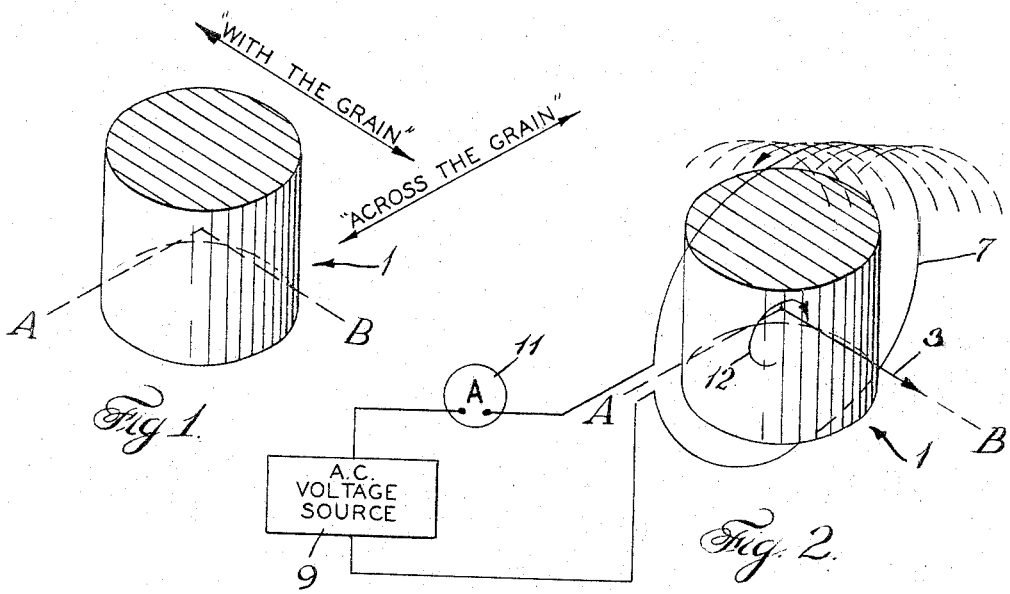
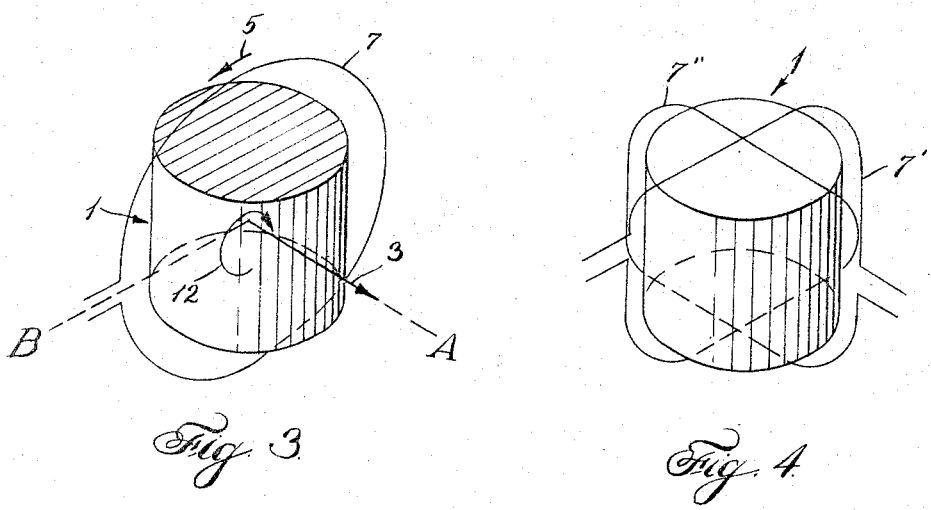
INVENTOR.
ISTVAN M. MATAY
BY
ATTORNEY

United States Patent Office 3,337,797
Patented Aug. 22, 1967

3,337,797
METHOD FOR DETERMINING THE FACTOR OF ANISOTROPY OF RESISTIVITY OF A GRAPHITE BODY
Istvan Mihaly Matay, Bay Village, Ohio, assignor to Union Carbide Corporation, a corporation of New York
Filed Feb. 19, 1963, Ser. No. 259,620
1 Claim. (Cl. 324—40)

The present invention relates to the measurement of the grain orientation of polycrystalline materials.

More particularly, the present invention relates to the determination of the bulk anisotropy of resistivity of polycrystalline materials.

In the manufacture of graphite, for example, the crystals in the mix material tend to be aligned with their longest dimension in the direction of extrusion or in the case of molding, perpendicular to the direction of applied molding force.

In either event, a predominant portion of the crystals in the finished graphite article are most often arranged with their longest dimension extending substantially in the same direction. That is, the arrangement of the crystals in the article form what can be considered to be a grain, with the long dimensions of the crystals being "with the grain." In molded graphites "with the grain" is perpendicular to the direction of molding; in extruded graphites it is in the direction of extrusion.

Since the crystals of materials, except perhaps tungsten, have different physical properties, e.g. resistivity, along their different axes, bulk polycrystallines, e.g. graphites also have different physical properties "with the grain" as compared to "across the grain."

In various applications, especially those involving nuclear and re-entry considerations, it is important to know the grain orientation of a graphite article or part.

Moreover, when a graphite part is to be replaced in an application in which grain orientation is a significant factor, it is necessary to be able to specify and/or confirm the required grain orientation in the replacement.

Since the grain orientation of a graphite part cannot usually be determined visually, it is highly desirable that simple and economical means be provided for this purpose.

It is therefore an object of this invention to provide a method and apparatus for determining the grain orientation of a conductive material.

Other objects will be apparent from the following description and claim taken in conjunction with the drawing in which—

FIGURE 1 shows a graphite article having a grain orientation with respect to a coordinate system as indicated, and FIGURES 2, 3, and 4 show a somewhat schematic representation of an apparatus suitable for use in the determination of grain orientation.

With reference to the drawing, FIGURE 1 shows a cylindrical graphite article 1 having "with the grain" orientation along coordinate B and "across the grain" orientation along coordinate A.

As before mentioned, and as is known to the art, the physical properties, including resistivity, are different "with" and "across" the grain.

In accordance with the present invention, the sample graphite article 1 is placed in an alternating magnetic field 3 which is established by the alternating current in coil 7. Coil 7, in FIGURE 2, has its axis extending perpendicular to coordinate A in the plane of the coordinate system. Alternating current voltage source 9 and ammeter 11 are also shown in circuit with coil 7.

The magnetic field established by the current in coil 7 which is represented by the vector 3 is in the plane of the coordinate system A–B and causes alternating currents 12 to be induced in the sample 1 in accordance with established principles.

The induced currents 12 are eddy currents and, also in accordance with established principles, flow in planes perpendicular to the magnetic field 3 of coil 7 and opposite in direction to the primary current 5 of coil 7 as indicated in the drawing.

The magnitude of the induced eddy currents of course depends upon the resistance in their path. Since for the conditions shown in FIGURE 2 the current flow is "across the grain" in the path of high resistivity, the current is relatively low.

The resistance in the direction of current flow encountered by the eddy currents is reflected back to coil 7 and acts as an additional load on the voltage source 9 in circuit with coil 7 and causes a change, i.e. an increase, in current as compared to the current in the coil when the sample is not surrounded thereby.

In other words, the coil 7 acts as the primary of a transformer and the sample acts as a one turn short circuited secondary coil. The resistance encountered by eddy currents in the sample is reflected back to the circuit of the coil and can be calculated routinely in accordance with the well known formula $$R_1 = \left(\frac{N_1}{N_2}\right)^2 R_2$$

where $R_1$ is the resistance reflected to the primary, $R_2$ is the secondary resistance, and $N_1/N_2$ is the ratio of primary to secondary turns.

For example, when coil 7 is energized by a given value of voltage and the sample 1 is remote from the coil, the current in the coil is determined only by the coil impedance.

When the sample is placed within the coil, the resistance encountered by the eddy currents induced in the sample is reflected to the coil and acts as an additional load on the applied voltage and the current therefore increases. The increase in current is a measure of the reflected resistance, $R_1$. The reflected resistance $R_1$ can be taken as the voltage across the coil divided by the increase in current. The resistance $R_2$ then, is the resistance in the sample in the direction or planes perpendicular to the magnetic field established by the coil. The increase in current in the coil, of course, is inversely proportional to the magnitude of the reflected resistance.

Referring again to the drawing and FIGURE 2 in particular, if it happens that when the sample 1 is placed within coil 7, the grain orientation is as shown, i.e. with the axis of the coil perpendicular to coordinate A, then the resistance reflected in the coil will be relatively large (and the increase in current relatively small) since the eddy currents are flowing "across the grain."

However, if the sample is rotated to the position shown in FIGURE 3, with the magnetic field and coil axis perpendicular to coordinate B, the eddy currents will flow "with the grain" and the reflected impedance will be lower than in the previous case (and the increase in current correspondingly larger).

Consequently, it can be seen that merely by rotating the sample in the coil, or by rotating the coil to provide relative rotational movement therebetween in the plane of coordinate A–B, the relative difference in resistivity or bulk anisotropy of resistivity along the coordinates can be determined.

In the practice of the present invention to directly obtain the "with the grain" direction in a sample of unknown orientation in the coordinate system of the plane A–B, the sample is inserted in the coil and rotated as before until minimum resistance is reflected in the coil, which is indicated by maximum increase in current in the coil. The "with the grain" direction is then perpendicular to the axis of the coil in the plane A–B for this position of minimum resistance, for example, as shown in FIGURE 3.

By rotating the sample 90° in the plane of the coordinate system, the "across the grain" reflected resistance can be determined and a difference between "with" and "across" the grain reflected resistances indicates bulk anisotropy. The ratio between the resistances gives the factor of anisotropy of resistivity. If the ratio is unity, the sample is isotropic as regards resistivity.

It is to be noted that in the practice of the present invention that either resistance values or current values can be used in determining the grain orientation or bulk anisotropy of resistivity since minimum resistance corresponds to maximum coil current and vice versa.

In the practice of the present invention, operating equipment is relatively inexpensive and uncomplicated.

The coil used to surround the sample is an ordinary multi-turn coil, such as a transformer winding, and the source of alternating current can be a laboratory type variable frequency oscillator. In order that the magnetic field of the coil corresponds to the direction shown in the drawing, it is necessary that more than one turn be used so as to enclose the coil as indicated by the dotted lines in FIGURE 2. Also, it is preferred that the coil closely fit the sample and for this purpose the coil can be rectangular as schematically shown in FIGURE 4.

The ammeter used for measuring the current in the coil circuit can also be an ordinary laboratory type alternating current instrument. However, conventional bridge type circuitry is preferred to provide the resistance measurements.

The sample may be supported on a suitable base or holder fabricated from an insulating material of the type which satisfies NEMA standard XXXP.

The graphite sample tested should be less than about 3 inches in the direction of the applied magnetic field and preferably has equal perimeters transverse to the directions of the respective applied magnetic fields as provided by the samples shown in the drawings. However, if the perimeters are not equivalent, the impedance measurements can be adjusted to give values usable in determining the factor of bulk anisotropy of resistivity.

In the event that the perimeters of the sample transverse to the directions of the respective applied magnetic fields are not equal, the value of one or the other reflected resistances is adjusted.

For example, the reflected resistance value obtained for eddy currents flowing within a smaller perimeter is increased by the ratio of the larger perimeter to the smaller. Alternatively, the value of reflected resistance obtained for eddy currents flowing within a larger perimeter is decreased by the ratio of the smaller perimeter to the larger perimeter. This adjustment is based on the established principle that the resistance to the eddy currents is proportional to the distance the eddy currents travel.

The frequency employed in the practice of the present invention is not critical, however, as a practical matter frequencies of about 40 kc./s. are used to provide a high sensitivity in measurements. Lower frequencies provide less sensitivity, and with increasing frequencies, the magnetic field penetration of the sample may be lessened and possibly provide misleading resistance values.

The voltage applied to the coil is not critical and the value used is that which is large enough to produce currents in the coil which can be conveniently measured.

The following example is provided to more fully describe the present invention.

*Example*

A coil (600 $\mu$henries; 0.62 $\Omega$-DC) approximately 3 inches in length and having a diameter of approximately 3 inches was connected in an A-C bridge as one of its arms. A variable frequency oscillator was connected as the generator for the bridge and applied a 40 kc./s. signal to the bridge. The impedance of the empty coil at 40 kc./s. $Z=0.62+(6.28\times4\times10^4\times600\times10^{-6})=151.34$ ohms.

A cylindrical sample having a diameter of 3 inches and a length of 3 inches was cut from a molded block of National Carbon ATJ graphite. The "with the grain" and "across the grain" directions of the graphite were known since the direction of molding of the block was known.

The sample was placed in the coil in the manner shown in the drawing and rotated about its longitudinal axis until a minimum impedance was detected by bridge measurement. This value of impedance was $4.73\times10^{-4}$ ohms. The sample was marked in this position with a line perpendicular to the axis of the coil to indicate "with the grain."

The sample was then rotated approximately 90° and a maximum impedance value, $5.44\times10^{-4}$ ohms, was obtained by bridge measurement. The measured impedance values, for practical purposes, correspond to the values of resistance encountered by the eddy currents in the sample.

The ratio of reflected impedance "across the grain" to "with the grain" was 1.15 which is the factor of bulk anisotropy of resistivity.

The "with theg rain" and "across the grain" directions determined in the foregoing manner corresponded to the known directions.

Also, although, for the purpose of clarity, the use of only one coil has been described in the practice of the present invention, the use of more than one coil is contemplated. For example, the arrangement indicated schematically in FIGURE 4 will enable the determination of the factor of anisotropy between two rectangular coordinates in a sample without requiring rotation of the sample. As can be seen, the coils of FIGURE 4 are shown in their preferred rectangular form.

It is to be understood that the measurement of bulk anisotropy between coordinates is not limited to rectangular coordinates but can be determined for any directions in the plane of the applied magnetic fields.

The foregoing description will also suggest other arrangements to those skilled in the art.

It is important in many instances to distinguish between molded and extruded articles. This can be done in the practice of the present invention by determining what is called the degree of orientation. The degree of orientation is determined by the minimum number of coordinates necessary to specify the configuration of grain orientation with respect to a three dimensional rectangular coordinate system. For one degree of orientation, "with the grain" orientation is defined by one coordinate. For two degrees of orientation "with the grain" orientation is defined by two coordinates.

To determine the degree of orientation, the orientation of the article is first obtained in the manner previously described. Then the orientation is determined with respect to the other coordinate in the three-dimensional coordinate system by suitable rotation of either a coil or the article. Extruded articles are indicated by one degree of orientation and molded articles are indicated by two degrees of orientation.

What is claimed is:

A method for determining the factor of anisotropy of resistivity of a graphite body, said body having a first and second coordinate direction, said coordinate directions lying in a plane passing through said graphite body which comprises directing an alternating magnetic field through said graphite body in said plane perpendicular to the first coordinate direction, said magnetic field being established by an alternating current carrying coil surrounding said graphite body, said coil having its axis in said plane and perpendicular to said first coordinate direction; determining the magnitude of the resistance encountered by the eddy currents induced in said graphite body and reflected in said coil by the alternating magnetic field perpendicular to the first coordinate direction; directing an alternating magnetic field through said graphite body in said plane perpendicular to the second coordinate direction, said magnetic field being established by an alternating current carrying coil surrounding said graphite body, said coil having its axis in said plane and perpendicular to said second coordinate direction; determining the magnitude of the resistance encountered by the eddy currents induced in said graphite body and reflected in said last mentioned coil by the alternating magnetic field perpendicular to said second coordinate direction; and determining the ratio of the resistance magnitudes to thereby provide an indication of the factor of anisotropy of resistivity of the graphite body.

References Cited

UNITED STATES PATENTS

| | | | |
|---|---|---|---|
| 2,260,562 | 10/1941 | Dillon | 324—14 |
| 2,334,393 | 11/1943 | Dillon | 324—13 |
| 2,963,642 | 12/1960 | Arbogest | 324—13 |
| 3,151,292 | 9/1964 | Orr | 324—13 |

RUDOLPH V. ROLINEC, *Primary Examiner.*

WALTER L. CARLSON, *Examiner.*

F. A. SEEMAR, R. J. CORCORAN, *Assistant Examiners.*